(12) United States Patent
Brueckner

(10) Patent No.: US 7,318,012 B2
(45) Date of Patent: Jan. 8, 2008

(54) PROBLEM SOLVING METHOD UTILIZING EMERGENT CLUSTERING AND CASE RETRIEVAL

(76) Inventor: Sven Brueckner, 7249 York St., Dexter, MI (US) 48130

( * ) Notice: Subject to any disclaimer, the term of this patent is extended or adjusted under 35 U.S.C. 154(b) by 393 days.

(21) Appl. No.: 11/040,036

(22) Filed: Jan. 21, 2005

(65) Prior Publication Data

US 2006/0167663 A1    Jul. 27, 2006

(51) Int. Cl.
*G06F 17/10* (2006.01)
(52) U.S. Cl. .............................. 703/2; 717/101; 716/4; 707/100; 707/102
(58) Field of Classification Search .................... 703/2, 703/11; 717/101; 715/530; 716/4; 438/200; 705/4, 52; 707/100, 102, 1, 3; 435/6; 713/176; 43/58
See application file for complete search history.

(56) References Cited

U.S. PATENT DOCUMENTS

| | | | | |
|---|---|---|---|---|
| 5,412,756 | A * | 5/1995 | Bauman et al. ................ | 706/45 |
| 5,706,333 | A * | 1/1998 | Grenning et al. ........... | 455/423 |
| 5,799,148 | A * | 8/1998 | Cuddihy et al. .............. | 714/26 |
| 6,964,019 | B2 * | 11/2005 | Shimizu et al. ............. | 715/530 |
| 7,017,043 | B1 * | 3/2006 | Potkonjak .................... | 713/176 |
| 2001/0051928 | A1 * | 12/2001 | Brody .......................... | 705/52 |
| 2002/0072162 | A1 * | 6/2002 | Dor et al. .................... | 438/200 |
| 2003/0187703 | A1 * | 10/2003 | Bonissone et al. ............. | 705/4 |
| 2004/0073844 | A1 * | 4/2004 | Unkle et al. .................. | 714/39 |
| 2004/0103108 | A1 * | 5/2004 | Andreev et al. ............ | 707/100 |
| 2004/0172612 | A1 * | 9/2004 | Kasravi et al. ............. | 717/101 |
| 2004/0193582 | A1 * | 9/2004 | Smyth ............................ | 707/3 |
| 2005/0042668 | A1 * | 2/2005 | Perlin ............................ | 435/6 |
| 2005/0086253 | A1 * | 4/2005 | Brueckner .................. | 707/102 |
| 2005/0154701 | A1 * | 7/2005 | Parunak et al. ................ | 707/1 |
| 2005/0154750 | A1 * | 7/2005 | Zhou et al. ................. | 707/102 |
| 2006/0136184 | A1 * | 6/2006 | Gustafsson et al. ........... | 703/11 |
| 2006/0150470 | A1 * | 7/2006 | Ronnau ......................... | 43/58 |
| 2006/0218512 | A1 * | 9/2006 | Arslan et al. .................. | 716/4 |

OTHER PUBLICATIONS

Regan et al., "Case-based tutoring in virtual education environments", ACM 2002.*

* cited by examiner

*Primary Examiner*—K. Thangavelu
(74) *Attorney, Agent, or Firm*—Gifford, Krass, Sprinkle, Anderson & Citkowski, PC

(57) ABSTRACT

An Adaptive, Any-Time Case Retrieval process combines existing knowledge (emergent clustering, case retrieval with CRN) in a novel and advantageous way. Although ideally suited to the Digital Body Development System (DBDS), the method is applicable to any problem solving environment involving iterative simulations. Given a description of a problem to be solved, a candidate solution is applied to generate a problem solving base case. The description of the problem is modified and the modification is recorded. Candidate solutions are applied to the problem as modified, thereby generating a problem solving event case. These steps are repeated so as to rank the relevance of the cases generated to arrive at an optimal solution to the problem. In the preferred embodiment a case retrieval network (CRN) structure is used in the ranking process.

19 Claims, 4 Drawing Sheets

PROBLEM SOLVING METHOD UTILIZING EMERGENT CLUSTERING AND CASE RETRIEVAL

FIELD OF THE INVENTION

This invention relates generally to problem solving and, in particular, to a method utilizing emergent clustering and case retrieval.

BACKGROUND OF THE INVENTION

The Digital Body Development System (DBDS) was launched in 2003. The project has the potential to save U.S. automobile manufacturers $3.5 billion in vehicle launch costs by shortening lead times, reducing the number of physical evaluation model builds, and improving the quality of vehicle body assemblies. The four-year project will involve significant new development of engineering software systems and will culminate in a validation phase implemented at two vehicle launches—one at Ford Motor Company and one at General Motors Corporation.

The project is a joint venture between Altarum Institute and the Center for Automotive Research (CAR). The joint venture includes an inter-disciplinary team consisting of auto companies (General Motors, Ford), software providers (EDS/UGS-PLM), die tooling, foundries, assembly tooling, metrology equipment providers, and other research organizations (Wayne State University and University of Michigan).

DBDS will enable the implementation of a virtual functional build methodology to help designers and vehicle launch teams make better decisions faster and understand the quality, cost, and timing impacts of those decisions. Modules under development identify problems in the current design of a vehicle body, suggest potential changes, and evaluate these changes with respect to their impact on manufacturability and expected cost.

DBDS takes a specific design of a car body or subassembly in the launch phase of a new vehicle, analyzes it for deviations from its functional specification, and seeks to determine changes to the design that reduce or remove these deviations (FIG. 1). The design provided to the DBDS is called "base design," and includes information about individual parts, their assembly process, and tools and fixtures used during the assembly. Once the launch team implements some or all of the suggested changes, DBDS receives the new base design and repeats the analysis and improvement process until the functional specification is met.

DBDS analyzes a given design by simulating the specified assembly process, using an existing assembly simulation (currently Vis-VSA by UGS/PLM). Deviation from the functional specification is measured on the virtual end product of the simulated assembly.

If the base design deviates from the functional specification, DBDS will begin generating alternative solution candidates, which are sets of changes to the base design that may be suggested to the launch team. DBDS applies the design changes represented by a new solution candidate to the base design, creating a new design. This new design is again analyzed for its deviation from the functional specification, using the assembly simulation. If the new design is a sufficient improvement compared to the base design, then DBDS will propose the solution candidate (set of changes) to the launch team. Otherwise, it will continue generating and evaluating new solution candidates (FIG. 2).

Algorithmically, the repeated generation and evaluation of new solution candidates utilizes a heuristic search process through the high-dimensional space of possible design changes, guided by a utility function that is based on the degree to which the new design reduces deviations from the functional specification compared to the base design.

SUMMARY OF THE INVENTION

This invention improves upon existing techniques by providing an Adaptive, Any-Time Case Retrieval process that combines existing knowledge (emergent clustering, case retrieval with CRN) in a novel and advantageous way. Although ideally suited to the Digital Body Development System (DBDS), the method is applicable to any problem solving environment involving iterative simulations.

Given a description of a problem to be solved, a candidate solution is applied to generate a problem solving base case. The description of the problem is modified and the modification is recorded. Candidate solutions are applied to the problem as modified, thereby generating a problem solving event case. These steps are repeated so as to rank the relevance of the cases generated to arrive at an optimal solution to the problem.

In the preferred embodiment a case retrieval network (CRN) structure is used in the ranking process, and information is exchanged through a shared dynamic environment that represents the space of possible problem configurations. The shared dynamic environment may be implemented with a Pheromone Infrastructure in which the information is deposited, modified, and retrieved by independent processes.

DETAILED DESCRIPTION OF THE INVENTION

Having discussed the high-level DBDS architecture in the Background of the Invention, in the following Detailed Description we discuss the meta-search heuristics, followed by the Adaptive Any-Time Case Retrieval algorithm.

Meta-Search Heuristic

APSE (Adaptive Parameter Search Engine)

The Adaptive Parameter Search Engine (APSE) guides the search for settings of input parameters of a simulation model that result in desired dynamics to arise in the execution of the simulation. Each such configuration setting is considered a solution candidate in APSE. The engine comprises an agent population (search agents) and a data management structure for solution candidates (search space).

Individual search agents generate new solution candidates, which are stored in the search space management structure.

A search agent has a unique location in search space that may change over time. A location in search space in APSE is a particular solution candidate that the search agent either created or adopted in its latest re-location step. It is the goal of the agent to find a location in search space (solution candidate) that carries a high fitness evaluation. The fitness of a location is a scalar numerical representation of the degree to which the execution of the corresponding solution candidate results in observed dynamics in the simulation that is configured by the candidate. The user of APSE specifies the fitness function. A measure of confidence is generated regarding whether the observed dynamics indicate a phase change in the model.

Figure 1:
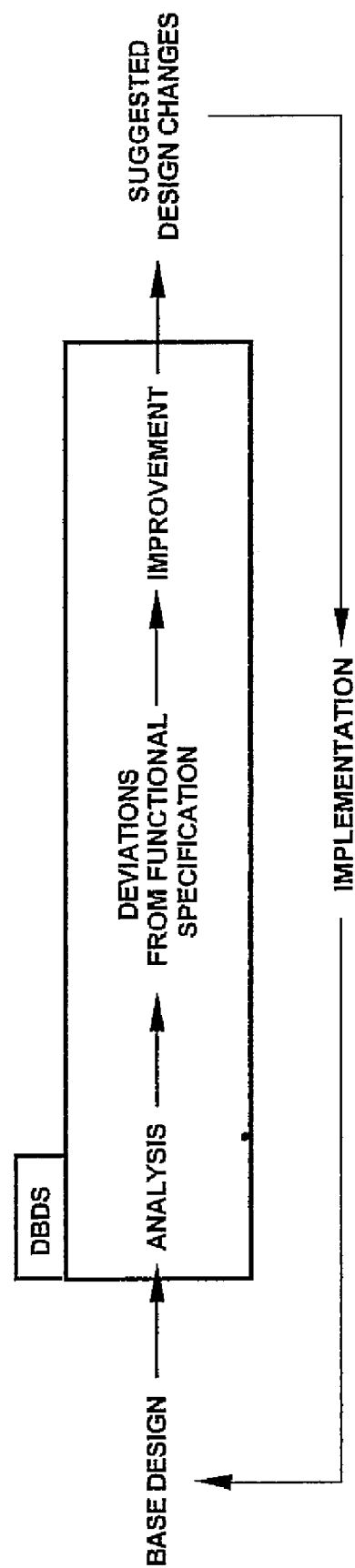
FIG. 1 is a diagram that illustrates how DBDS improves a given design to reduce deviations from functional specification.
Figure 2:
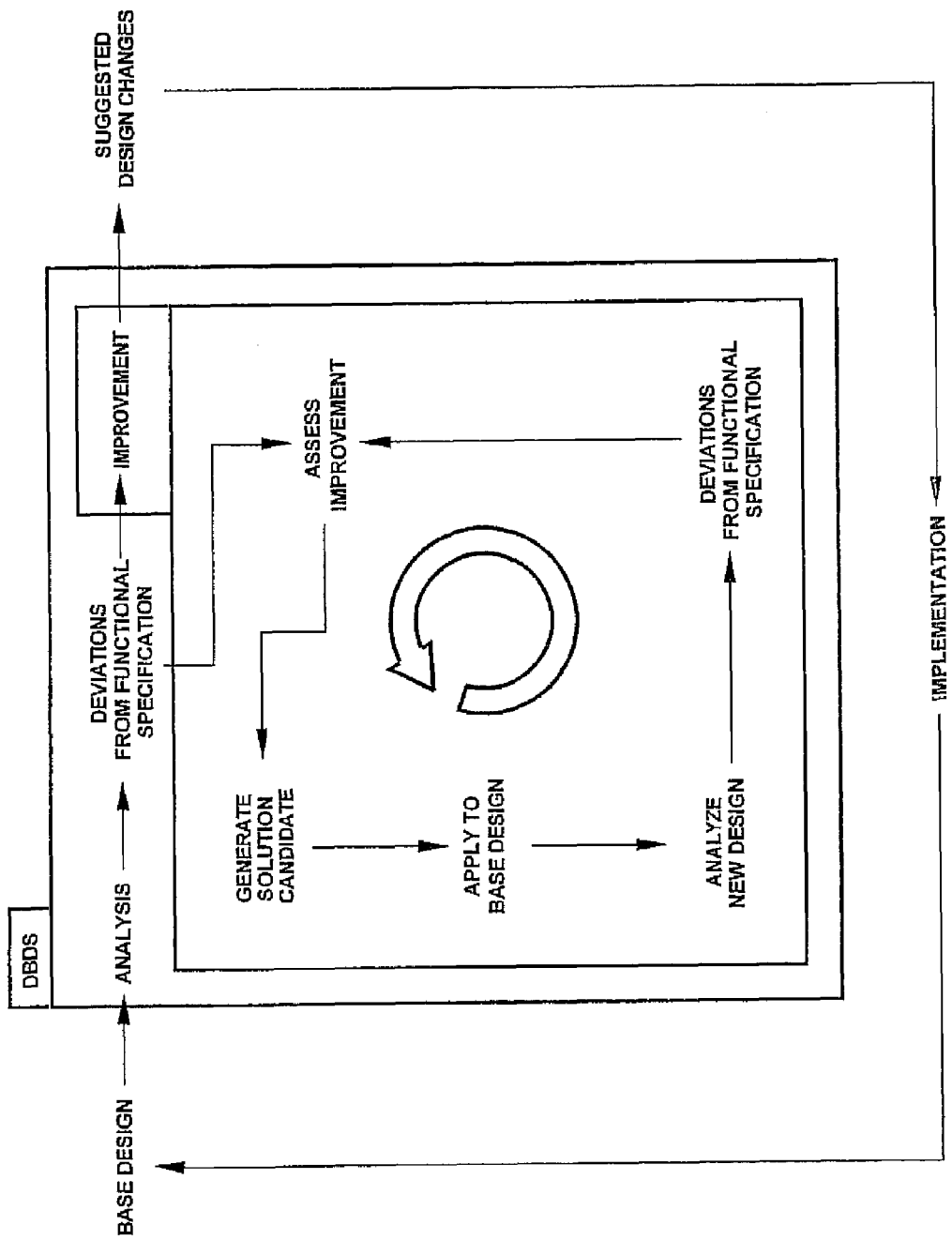
FIG. 2 is a diagram that shows how the improvement of the base design is an iterative process that generates and evaluates alternative solution candidates.
Figure 3:
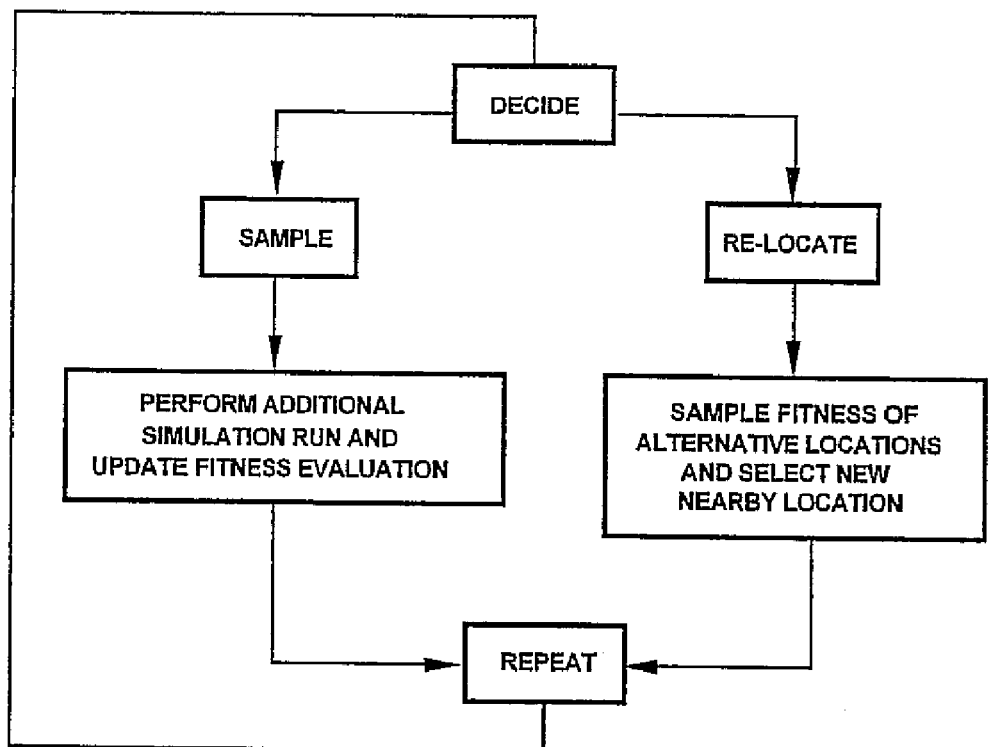
FIG. 3 depicts a search agent decision loop as developed in DARPA ANT.

The cyclical decision process of the individual agent is very simple, but repeated across the entire population, it results in an effective parallel search process that seeks to minimize the expenditure of computing resources (simulation runs) while maximizing the fitness of the best known solution candidate. Each agent repeatedly executes the same decision process as depicted in FIG. 3. First, the agent decides whether to contribute to the fitness evaluation of its current solution candidate ("sample"), or whether to create or adopt a new solution candidate ("re-locate").

Evaluating the fitness of a solution candidate entails executing the simulation with the parameter settings provided by the solution candidate. If the underlying simulation model is deterministic, then only one simulation run is required per solution candidate and the agent will only consider the "sample" option, if this simulation run had not yet been executed. However, if the simulation is non-deterministic, additional runs will improve the confidence level of the fitness evaluation. In this case, the agent tends to choose the "sample" option if the current confidence is relatively low. Furthermore, locations with a low confidence level are more likely to receive additional simulation runs if their (roughly) estimated fitness is high, since they "look more promising."

If the agent decides against further sampling at its current location, it will seek to replace its current solution candidate with a different one. Thus, the agent will re-locate in search space. In APSE, the agent assumes its new location through a short-range move, which is a relatively small modification to its current solution candidate. The agent determines the "direction" of the move—which aspects of the solutions are changed how—in combination of a local hill-climbing approach and a Particle Swarm Optimization (PSO) approach. It samples the fitness of existing, but not necessarily occupied, nearby locations and it samples the fitness of locations currently occupied by other search agents. The agent is attracted towards locations that have a significantly higher fitness then the agent's current location. The weighted sum of these attractive forces determines the direction of the agent's move, but the length of the step is limited to a small amount (incremental change). If the re-location of the agent takes it to a location that had not been occupied by any other agent before, then a new solution candidate is created. Otherwise, the agent adopts an existing candidate. In APSE, we choose the initial location of the search agents randomly.

RAADSI (Resource-Aware Adaptive Dynamic Search Infrastructure)

RAADSI is similar to APSE in that it explores alternative input configurations to a simulation (modified base designs) and evaluates their fitness based on observations from the simulation (divergence from functional specification). The exploration of solution candidates is guided by a population of search agents and a solution candidate is a set of changes to the base design that produce the modified design tested in the simulation.

The APSE heuristic guides the search of the agents and thus their generation of new solution candidates solely based on the abstract fitness landscape spanned over the search space. As such, it is completely domain and problem independent, similar to genetic or evolutionary optimization methods.

Using a problem independent heuristic is a good first approach that may suffice in many less complex search spaces. But to cope with more complex optimization problems, such as the DBDS one, additional problem solution knowledge should be brought to bear. Furthermore, knowledge about solution candidates that have already been tried out (simulated) will also help guide the search of the agents.

We enhanced the decision process of the search agent to distinguish between short-range moves that slightly modify the agent's solution candidate and long-range jumps that replace the solution candidate with a completely unrelated one. With short-range moves, an agent explores its current region in search space, just as the APSE agents do, but these modifications may also take observations from the simulation of the current solution candidate into account. With long-range jumps, an agent abandons its current region of the search space for a new location, essentially beginning a new exploration cycle.

Figure 4:
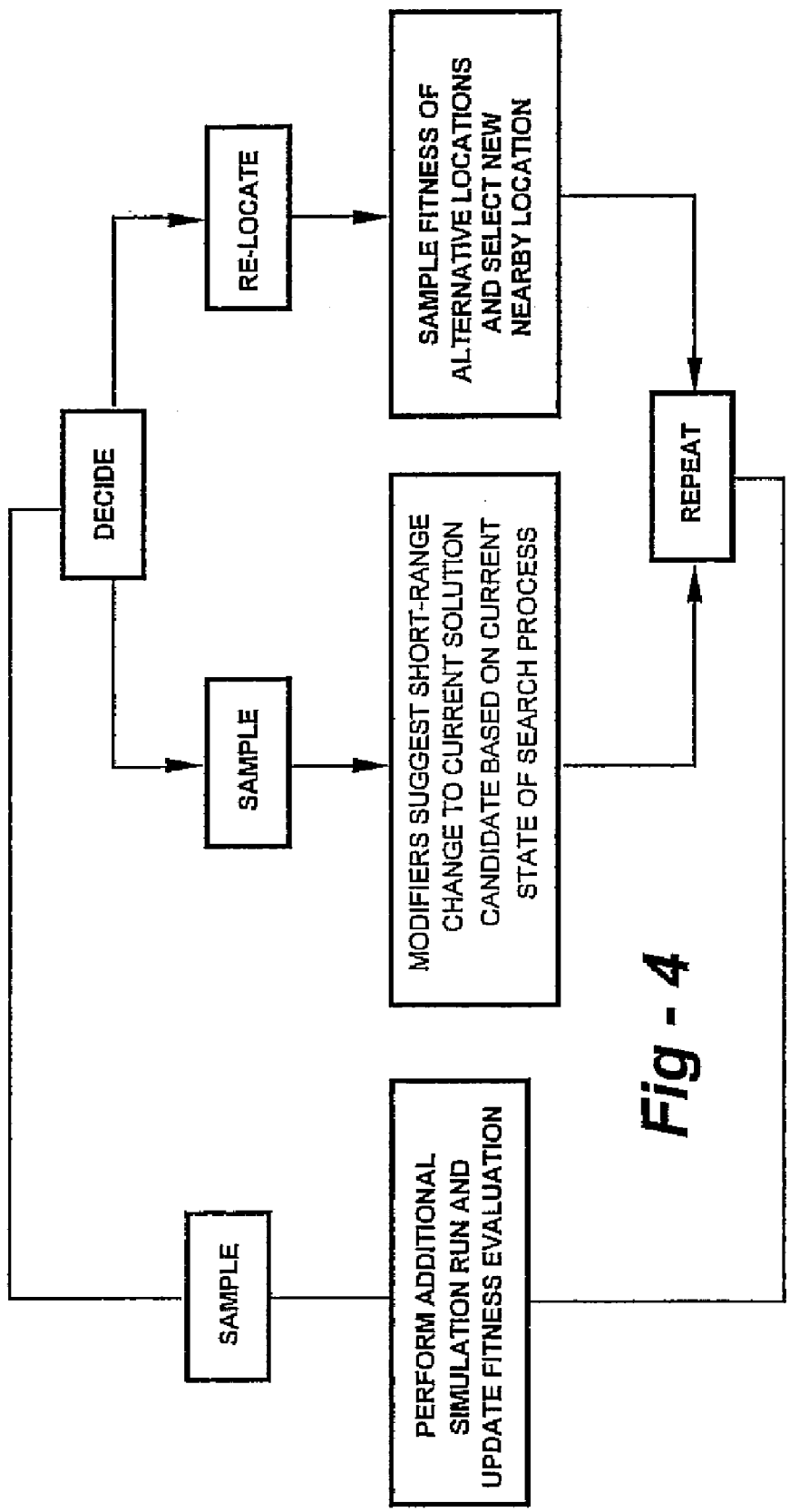
FIG. 4 shows how RAADSI's enhanced agent decision process dynamically decides between short-range moves and long-range jumps.

The enhanced decision cycle in RAADSI is depicted in FIG. 4. The DBDS architecture includes Modifier instances that apply their respective logic to suggest short-range moves and Solver instances that propose long-range jumps to the agents.

The new search agent begins its decision process with the "sample" or "re-locate" decision, which determines whether the agent will create or adopt a new solution candidate or add another sample to its current location's fitness estimate. This decision is still taken in the APSE way.

If the agent decides to re-locate, it will now examine the rate of fitness improvement that it experienced in the recent past. If this rate was high, then the agent considers its current region of the search space sufficiently promising enough to explore it some more and it will re-locate in a short-range move to a nearby location. Otherwise, the agent will consult the currently available Solver instances to receive a now solution candidate for a long-range jump.

Solvers are applying problem solving knowledge to the faults observed in the base design to generate new solution candidates. As the search agents continue to explore the space of possible design changes, Solvers may take observations from these trials into account when they propose a solution. Thus, dynamically integrating problem solving knowledge into the search process will enhance its performance. One such novel Solver algorithm is discussed in the next section.

Adaptive Any-Time Case Retrieval Solver

The essence of the invention resides in a novel approach to dynamically retrieve cases of past problem solving events from a case base. The case retrieval system is an any-time process that runs parallel to the distributed agent search and takes into account the characteristics of the original problem, as well as the quality of solution candidates that have already been tried out. This adaptive, any-time case retrieval algorithm will be integrated into the DBDS architecture as a Solver instance.

Figure 5:
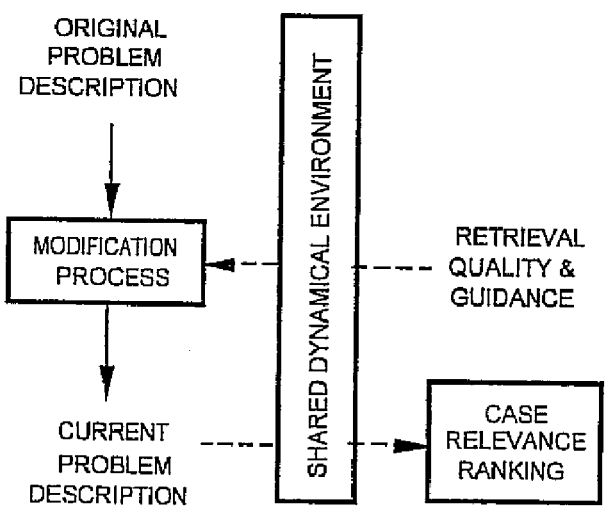
FIG. 5 depicts the components of an Adaptive, Any-Time Case Retrieval Solver according to the invention.

The Solver implementing the case retrieval process has two major components that establish a tight feedback loop (FIG. 5). The first component is the modification of the description of the current problem to explore the surrounding space of similar configurations. The second component is the case relevance ranking that establishes the respective relevance of the recorded cases with respect to the current modification of the problem description. These two components alternate in their execution, exchanging information through a shared dynamic environment that represents the space of possible problem configurations. This environment is preferably a Pheromone Infrastructure (PI) in which information is deposited, modified, and retrieved by independent processes. The PI bins the space spanned by a subset of the dimensions that are occupied by the anchor points. Information about the description of the current problem is deposited onto these bins and thus becomes available as the problem signature.

The modification of the current problem description explores similar problem descriptions, which in turn modifies the degree, to which individual cases match to the problem. We measure the quality of the retrieval from the case base under a given problem description by the entropy of the selection probabilities of the individual cases. These probabilities derive from the normalized similarity of the problem description recorded in the respective cases with the current problem description. If the Adaptive Any-Time Case Retrieval Solver is being asked to deliver a solution to the current problem, it will select a case from the case base probabilistically, using the associated probabilities, and extract and return the solution recorded in this historical case. This solution is then tried out (preferably using simulation) and evaluated by assigning a numerical score. The score is returned to the Solver to further influence the problem modification process.

We use a Case Retrieval Network (CRN) structure to represent the relevance of specific components of problem descriptions to recorded solution cases. Our current CRN model is taken directly from the research publications of M. Lenz and H. D. Burkhardt at Humboldt University Berlin, Germany.

The problem encountered with a specific design is represented as a pattern of Anchor points defined on the virtual assembly model. An Anchor point has a specific geometric location and additional information, such as the assembly context or the magnitude of deviation from specification at the Anchor location define its location in other dimensions of the problem space.

The problem description modification process performs an ongoing emergent clustering of the Anchor points in the high-dimensional problem space. Although an ant-based clustering mechanism is preferred, we settled on a simple force model that treats individual Anchor points as active agents that are attracted to nearby Anchors and to their respective original location. The emergent pattern of Anchor clusters is influenced by the resulting quality of the case retrieval and the location of problem description components of cases whose solutions have already been tried out by the search agents.

Our CRN comprises information entity (IE) nodes that represent observed locations of anchor point clusters, linked to case nodes that represent the historical case in which these clusters were observed as well as a description of the solution that has solved the problem encountered in this historical case. The current arrangement of anchor point clusters as conveyed by the Pheromone Infrastructure places an activation onto the IE nodes inverse proportional to the distance between the observed cluster in the current signature and the cluster location represented by the respective IE. The links between the IE nodes and the case nodes propagates this activation to the case nodes and the resulting activation of the case nodes determines the selection probability of the particular case.

I claim:

1. A computer implemented method of selecting historical problem/solution cases for a design of an end product having a case base, comprising the steps of:
    a) creating an arrangement of anchor points that combine observed deviations of the end product from functional specifications based on predefined measurement parameters of the design;
    b) storing, in memory, a set of historical problem/solution cases associated with the design;
    c) modifying the arrangement of the anchor points by a binning process and extracting a dynamic problem signature describing the current problem from the modified arrangement in bins;
    d) retrieving the historical problem/solution cases and ranking the cases according to their similarity to the extracted signature, generating a rank score for each case, wherein the rank score is computed using data from the dynamic problem signature and problem signatures of historical cases;
    e) repeating steps c) and d) until the rank score of a highest ranked case is equal to or greater than a pre-specified quality, where the quality is a function of selection probabilities of the cases in the case base;
    f) selecting a problem/solution case that has a highest ranked score;
    g) evaluating the selected problem/solution case based upon its divergence from the functional specifications;
    h) repeating steps c) through g) until a specified number of problem/solution cases applicable to the design of the end product are selected; and
    i) saving the selected problem/solution cases in a file.

2. The method of claim 1, wherein the anchor points include additional contextual data describing a problem domain.

3. The method of claim 1, wherein the step of selecting a problem/solution case is carried out probabilistically.

4. The method of claim 1, wherein the step of evaluating a selected case is based upon a manufacturing assembly simulation.

5. The method of claim 1, wherein the step of modifying the arrangement of the anchor points is based upon emergent clustering of anchor points.

6. The method of claim 5, wherein the anchor points are treated as clustering agents.

7. The method of claim 6, wherein the clustering agents are attracted to other, nearby agents.

8. The method of claim 7, wherein the dynamic problem signature is based upon locations of the clustering agents at a particular point in time.

9. The method of claim 8, wherein discrete binning of clustering agent locations produces the dynamic problem signature.

10. The method of claim 9, wherein the clustering agent locations are binned by a pheromone infrastructure (PI) and repeated deposits of digital pheromones at the anchor points.

11. The method of claim 10, wherein dynamic problem signature locations are recorded as a subset of locations of bins in the PI, wherein the dynamic problem signature locations determine the binning locations of the anchor points.

12. The method of claim 5, wherein:
case selection involves probabilities exhibiting a Shannon Entropy.

13. The method of claim 1, wherein each historical case has a recorded problem signature, wherein the recorded problem signature is based on the binning locations of anchor points of the historical case, wherein the anchor points of the historical case are based on deviations of the historical case end product from functional specifications.

14. The method of claim 1, wherein the historical cases are arranged in a case retrieval network (CRN).

15. The method of claim 14, wherein the CRN includes information, entity nodes representing observed locations of clusters of anchor points of the historical cases.

16. The method of claim 14, wherein the CRN is activated by the locations of the clusters of anchor points defined in the dynamic problem signature.

17. The method of claim 14, wherein the rank score of each historical case is determined by its current activation in the CRN where the current activation is a function of a distance between an observed location of a cluster of anchor points in the dynamic problem signature and location of a cluster of anchor points of the historical case in the recorded problem signature.

18. The method of claim 1, wherein:
The selection of a historical problem/solution case has a probability associated therewith; and
the probability is proportional to its rank score.

19. The method of claim 1, wherein the quality of the rank score is the Shannon Entropy of the selection probabilities associated with the cases in the case base.

* * * * *